United States Patent
Tertoolen et al.

(10) Patent No.: US 9,638,539 B2
(45) Date of Patent: May 2, 2017

(54) NAVIGATION METHODS AND APPARATUS

(71) Applicant: TomTom International B.V., Amsterdam (NL)

(72) Inventors: Simone Tertoolen, Rotterdam (NL); Lilit Janpoladyan, The Hague (NL)

(73) Assignee: TomTom Navigation B.V., Amsterdam (NL)

( * ) Notice: Subject to any disclaimer, the term of this patent is extended or adjusted under 35 U.S.C. 154(b) by 0 days.

(21) Appl. No.: 14/143,595

(22) Filed: Dec. 30, 2013

(65) Prior Publication Data

US 2014/0114574 A1   Apr. 24, 2014

Related U.S. Application Data

(63) Continuation-in-part of application No. PCT/EP2012/062845, filed on Jul. 2, 2012.

(30) Foreign Application Priority Data

Jun. 30, 2011 (GB) .................................. 1111143.2

(51) Int. Cl.
   *G01C 21/34* (2006.01)
   *G08G 1/123* (2006.01)
   *G01C 21/36* (2006.01)

(52) U.S. Cl.
   CPC ....... *G01C 21/367* (2013.01); *G01C 21/3676* (2013.01); *G01C 21/36* (2013.01); *G01C 21/3635* (2013.01); *G01C 21/3673* (2013.01)

(58) Field of Classification Search
   CPC .. G01C 21/36; G01C 21/367; G01C 21/3635; G01C 21/3673; G01C 21/3676; G08G 1/0969

USPC ......................................... 701/532, 533, 534
See application file for complete search history.

(56) References Cited

U.S. PATENT DOCUMENTS

| | | | | |
|---|---|---|---|---|
| 4,675,676 A | * | 6/1987 | Takanabe et al. | ....... 340/995.15 |
| 4,796,189 A | * | 1/1989 | Nakayama et al. | .......... 701/430 |
| 4,914,605 A | * | 4/1990 | Loughmiller et al. | ........ 345/649 |
| 5,084,822 A | * | 1/1992 | Hayami | ........................ 701/455 |
| 5,444,618 A | * | 8/1995 | Seki et al. | ........................ 702/5 |

(Continued)

FOREIGN PATENT DOCUMENTS

DE   102009022143 A1   12/2009
EP       0570223 A1   11/1993

(Continued)

OTHER PUBLICATIONS

English Machine translation for reference DE102009022143.*

(Continued)

*Primary Examiner* — Nicholas Kiswanto
*Assistant Examiner* — Rachid Bendidi

(57) ABSTRACT

A method of operating a navigation apparatus is provided. A calculated route is shown on a map display of the apparatus together with a current position indication. In one embodiment, a maximum map scale is determined which will result in a representation of the entire remainder of the route being shown within a visible map display area during travel along the route. In another embodiment, a map scale is set, and the map display is then controlled to maximize the amount of the remainder of the route which is shown within a visible map display area for the given map scale during travel along the route.

11 Claims, 6 Drawing Sheets

(56) References Cited

U.S. PATENT DOCUMENTS

| | | | |
|---|---|---|---|
| 5,450,343 A * | 9/1995 | Yurimoto et al. | 701/410 |
| 5,689,423 A * | 11/1997 | Sawada | 701/454 |
| 5,731,979 A | 3/1998 | Yano et al. | |
| 5,848,373 A * | 12/1998 | DeLorme et al. | 701/455 |
| 5,991,688 A * | 11/1999 | Fukushima et al. | 701/411 |
| 6,023,652 A * | 2/2000 | Arakawa et al. | 701/454 |
| 6,061,003 A * | 5/2000 | Harada | 340/995.15 |
| 6,128,571 A * | 10/2000 | Ito et al. | 701/426 |
| 6,307,485 B1 * | 10/2001 | Hasegawa | 340/995.15 |
| 6,567,744 B1 * | 5/2003 | Katayama et al. | 701/410 |
| 6,574,551 B1 | 6/2003 | Maxwell et al. | |
| 6,732,049 B2 * | 5/2004 | Sato et al. | 701/416 |
| 7,440,875 B2 * | 10/2008 | Cuthbert et al. | 703/2 |
| 2002/0171650 A1 | 11/2002 | Prabhakaran | |
| 2003/0191580 A1 * | 10/2003 | Endo et al. | 701/202 |
| 2005/0049779 A1 * | 3/2005 | Yasuda et al. | 701/200 |
| 2006/0074553 A1 * | 4/2006 | Foo et al. | 701/212 |
| 2006/0220923 A1 * | 10/2006 | Tanizaki et al. | 340/995.1 |
| 2007/0198184 A1 * | 8/2007 | Yoshioka et al. | 701/211 |
| 2008/0027637 A1 * | 1/2008 | Sakano | G01C 21/367 701/533 |
| 2008/0275645 A1 * | 11/2008 | Hoshino | 701/209 |
| 2009/0037093 A1 * | 2/2009 | Kurihara et al. | 701/201 |
| 2010/0100846 A1 * | 4/2010 | Yoshida | 715/810 |
| 2010/0268448 A1 * | 10/2010 | Doan et al. | 701/201 |
| 2011/0022295 A1 * | 1/2011 | Lee | 701/200 |

FOREIGN PATENT DOCUMENTS

| | | |
|---|---|---|
| EP | 0678731 A1 | 10/1995 |
| EP | 1174843 A1 | 1/2002 |
| GB | 2408187 A | 5/2005 |
| GB | 2444415 A | 6/2008 |
| JP | 11295082 A | 10/1999 |
| WO | 0052664 A1 | 9/2000 |

OTHER PUBLICATIONS

International Search Report of Oct. 5, 2012 for International Application No. PCT/EP2012/062845.

Search Report of Sep. 19, 2011 for United Kingdom Application No. GB1111135.8.

Search Report of Sep. 19, 2011 for United Kingdom Application No. GB1111143.2.

* cited by examiner

NAVIGATION METHODS AND APPARATUS

CROSS-REFERENCES TO RELATED APPLICATIONS

This application is a continuation-in-part of International Patent Application No. PCT/EP2012/062845 filed Jul. 2, 2012, and designating the United States, and which claims priority from United Kingdom Patent Application No. 1111143.2 filed Jun. 30, 2011. The entire content of both applications is incorporated herein by reference.

FIELD OF THE INVENTION

The present invention relates to methods of providing route information using a navigation apparatus, and a navigation apparatus arranged to carry out such methods.

Illustrative embodiments of the invention relate to portable navigation devices (so-called PNDs), in particular PNDs that include Global Positioning System (GPS) signal reception and processing functionality. The invention is also applicable to a navigation apparatus, and methods for operating such apparatus, which forms part of an integrated navigation system, e.g. an in-vehicle navigation system. Other embodiments relate, more generally, to any type of processing device that is configured to execute navigation software so as to provide navigation functionality, and methods of operating such devices.

BACKGROUND TO THE INVENTION

The present invention is directed to methods for displaying route information using a navigation apparatus, and to a navigation apparatus arranged for carrying out the steps of the methods in accordance with embodiments of the invention. The navigation apparatus may comprise navigation apparatus of any suitable form as discussed above, and in more detail below. One illustrative embodiment of the apparatus is a portable navigation device. Portable navigation devices (PNDs) that include GPS (Global Positioning System) signal reception and processing functionality are well known and are widely employed as in-car or other vehicle navigation systems.

In general terms, modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favorite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO1005 LIVE model manufactured and supplied by TomTom International B.V., provide a reliable means for enabling users to navigate from one position to another.

While navigation apparatus previously proposed are of great utility in guiding a user along a determined route, the Applicant has realised that there remains scope for improvement in the way in which progress along a determined route is displayed to a user. In particular, the Applicant has realised that currently, a user may need to manually carry out operations, such as zooming or panning operations, in order to optimise their view of displayed route information during travel along the route. It is undesirable for the user to have to carry out such operations as this may interfere with their ability to concentrate on the primary task of driving. The present invention seeks to provide improve improved methods and apparatus for displaying route information to a user during travel along a determined route.

SUMMARY OF THE INVENTION

In accordance with a first aspect of the invention there is provided a method for displaying route information using a navigation apparatus, the method comprising:

determining a route from a first location to a second location; and providing, on an electronic map displayed by the navigation apparatus, a representation of a current position and a representation of at least a part of the remainder of the determined route during travel along the determined route, wherein the method comprises controlling the map display to maximise the amount of the remainder of the route that is represented in a visible map display area for a given map scale during travel along the route.

The present invention also extends to a navigation apparatus arranged to carry out a method in accordance with the present invention in any of its aspects or embodiments.

In accordance with a second aspect of the present invention there is provided a navigation apparatus comprising:

a display for displaying an electronic map to a user;

means for accessing digital map data and causing an electronic map to be displayed to a user using the display; and means for determining a route from a first location to a second location, the apparatus further comprising:

means for providing, on an electronic map displayed on the display, a representation of a current position and a representation of at least a part of a remainder of a determined route during travel along a determined route; and means for controlling the map display to maximise the amount of the remainder of the route that is represented in a visible map display area for a given map scale during travel along the route.

In accordance with these aspects of the invention, therefore, during travel along a determined route, a representation of at least a part of a remainder of the determined route is provided on a displayed electronic map together with a representation of a current position. In accordance with the invention the map display is controlled to maximise the amount of the remainder of the route that is represented i.e. displayed in a visible map display area for a given map scale during travel along the route. In other words, the map display is controlled so that as much of the route representation as possible is shown for a given map scale. The present invention provides a way of controlling the map display so as to maximise the amount of the remainder of the route that can be shown where there is no freedom to change the map scale. Embodiments of the present invention therefore result in a greater proportion of the remainder of a route being displayed to a user during travel along the route given certain constraints as will be described in more detail below. The need for the user to manually intervene to adjust display settings e.g. by panning the displayed map may be reduced, in turn reducing the likelihood of driver distraction. This may be achieved at a map scale that is preset or which has been set by a user.

It will be appreciated that in accordance with these aspects of the invention the step of controlling the map display of the navigation apparatus to maximise the amount of the remainder of the route that is represented in the visible map display area for a given map scale is carried out automatically. In embodiments this step is carried out by the navigation apparatus. In embodiments, this step is carried out under the control of a set of one or more processors of the navigation apparatus. The step is carried out without user intervention. The same applies to any other steps relating to control of the map display described herein.

In accordance with another aspect of the invention there is provided a method for displaying route information using a navigation apparatus, the method comprising:

determining a route from a first location to a second location; and providing, on an electronic map displayed by the navigation apparatus, a representation of a current position and a representation of the remainder of the determined route during travel along the determined route, wherein the method comprises scaling the displayed map so as to maximise the map scale while providing a representation of the entire remainder of the determined route in a visible map display area during travel along the route.

The present invention also extends to a navigation apparatus arranged to carry out a method in accordance with the present invention in any of its aspects or embodiments.

Thus, in accordance with a further aspect of the present invention there is provided a navigation apparatus comprising:

a display for displaying an electronic map to a user;

means for accessing digital map data and causing an electronic map to be displayed to a user using the display; and means for determining a route from a first location to a second location, the apparatus further comprising:

means for providing, on an electronic map displayed on the display, a representation of a current position and a representation of the remainder of a determined route during travel along a determined route; and means for scaling the displayed map so as to maximise the map scale while providing a representation of the entire remainder of the determined route in a visible map display area during travel along the route.

In accordance with these aspects of the invention, therefore, during travel along a determined route, a representation of an entire remainder of the determined route is provided in a visible map display area of a displayed electronic map together with a representation of a current position. The scale of the displayed map is maximised while maintaining the representation of the entire route in the visible map display area during travel along the route. It will be appreciated that as the remainder of the determined route decreases during travel along the route the scale of the map display may be increased while still allowing the entire remainder of the determined route to be shown. In other words, the amount of the remaining route to be shown decreases progressively. In accordance with the invention, the map scale is adjusted so as to take advantage of the ability to increase the scale of the map as the remainder of the route decreases. In this way, the user may be provided with a display of the remainder of the route which is maximised in relation to map scale, facilitating interpretation of the map display. The user does not need to intervene to manually adjust the map scale, and is able to concentrate on the primary task of driving with less distraction.

It will be appreciated that the invention in any aspects may comprise any or all of the features described in respect of the method of the first aspect of the invention, and vice versa. Thus, if not explicitly stated, the method may comprise the steps of performing any of the steps described in relation to the apparatus, and the apparatus of the invention may be arranged to perform any of the method steps herein described. Any of the method steps may be carried out by the navigation apparatus, and the method may comprise causing the navigation apparatus to carry out any of the steps described. The apparatus may comprise a set of one or more processors arranged to carry out any or all of the steps mentioned. Any step may be carried out by any one of the processors, or by multiple processors. Different steps may be carried out by the same, or different sets of processors. For example, the "means for" carrying out any of the steps described may be a set of one or more processors, and the term "means for" may accordingly be replaced by the term "a set of one or more processors". It will also be appreciated that the same or different means may be used to carry out any of the functions herein described. Thus the use of the term "means for" does not necessarily imply that the means for is different to any other "means for" that is referenced, and the same or separate means may be used to carry out any one or ones of the functions described.

The term "visible map display area" refers to the area of a displayed map visible to a user. This may correspond to the area of the display of the apparatus, or may be an area less than the area of the display. The edge of the visible map display area may or may not therefore correspond to the edge of the display. For example, navigation information which may e.g. relate to the remaining distance or estimated time to destination may be displayed e.g. in status bars in peripheral regions of the display. Such information may be located beyond the edges of the displayed map and does not form part of the "visible map display area". In other cases, such information may be superimposed over the map display so as to occlude peripheral parts of the displayed map, at least to the extent that a user would not be able to visually determine detail of the map in the occluded region. The visible map display area will then exclude any such occluded parts of the map and may define a boundary inboard of such occluded areas. The visible map display area may also be referred to as the visible area of the displayed map.

In embodiments the visible map display area comprises a boundary. The visible area may define a plurality of edges extending along the boundary. The boundary may be in the form of a frame. In some embodiments the boundary is rectangular and the visible area defines four edges extending along respective sides of the boundary. It will be appreciated that the visible map display area may change during progress along a route. For example, a status bar may temporarily be located over a peripheral part of the displayed map along one edge to provide certain information e.g. relating to the presence of speed cameras. In accordance with the invention, steps involving displaying or representing the current position and/or the at least a part of the remainder of the route in the visible map display area are by reference to that area which may be taken to be the visible map display area at any given time during travel along the route.

The current position herein refers to a current position of the navigation apparatus or the user. The current position of the apparatus may be taken as the current position of the user and vice versa. In embodiments in which the navigation apparatus is located in a vehicle, the current position will be the position of the vehicle. The current position is indicated by a position e.g. GPS signal. In embodiments the navigation apparatus therefore comprises means for determining a current position of the apparatus, and the method may further comprise determining the current position of the apparatus during travel along the route, preferably with the navigation apparatus carrying out this step. The position determining means may be GPS positioning means or any other type of positioning means. In accordance with the invention, a representation of the current position is provided during travel along the determined route. The method may comprise monitoring current position during travel along the route, preferably with the navigation apparatus carrying out this step, and the apparatus may comprise means for so doing. Such monitoring may be carried out intermittently or continually. Such position monitoring and determination may be carried out in any manner, for example using techniques conventional in route guidance using a navigation apparatus.

In accordance with the invention, the representation of current position and the representation of the at least a part of the remainder of the determined route are provided during travel along the route. In preferred embodiments they are provided throughout travel along the route i.e. during travel along the entire route. However, this is not essential provided that they are provided during a travel over at least one continuous part of the route. The same applies to the step of controlling the map display to maximise the amount of the remainder of the route that is represented in the visible map display area. This step is also carried out during travel along the route which may preferably be throughout the route, or otherwise during travel along at least one continuous part thereof. Various embodiments are described below regarding the manner in which the map display is controlled. For the avoidance of doubt, it will be appreciated that the map display is controlled in the manner described during travel along the route, i.e. over at least one continuous part thereof, and optionally throughout travel along the route.

The representation of current position may be of any suitable type. Various types of representation are used in the art of route guidance using a navigation apparatus. The representation is a visual representation. The representation may comprise a graphical symbol or symbols, and in some preferred embodiments comprises an icon. In some embodiments the representation is in the form of an arrow.

The step of providing a representation of the current position and the at least a part of the remainder of the route to the destination preferably comprises superimposing the representations on the displayed electronic map. In other words, the displayed map may be in the form of a background map image. The map may be referred to as a "background map". The step of providing the representations comprises displaying the representations on the displayed map.

The representation of the at least a part of the remainder of the determined route may be of any suitable form. The representation is a visual representation. The representation may comprise a graphical symbol or symbols. The representation should be readily visible to a user when superimposed on a displayed map. Again, any form of representation used in the field of route navigation using a navigation apparatus may be used. The representation may be in the form of any type of map enhancement. For example, the representation may comprise a highlight. The remainder of the determined route includes the second location, and the representation may include a representation thereof. The representation of the second location may be, for example, simply an end of a representation of the rest of the route, and/or may be a specific e.g. icon. It will be appreciated that the part of the remainder of the route that is displayed or represented may or may not include the second location. The representation of the at least a part of the remainder of the route may be in the form of a line.

It will be appreciated that, in accordance with the invention, the navigation apparatus is arranged to display an electronic map. The navigation apparatus is therefore arranged to be able to access digital map data and to use the data to cause the electronic map to be displayed, and the method may comprise the step of the navigation apparatus accessing digital map data and using the data to cause the electronic map to be displayed. The digital map data may be obtained from any source or sources accessible to the navigation apparatus. The source(s) may be local and/or remote. In preferred embodiments the navigation apparatus comprises a memory storing digital map data, and uses the stored digital map data to cause the electronic map to be displayed.

In preferred embodiments the electronic map displayed to the user and upon which the representation of current position and at least a part of the remainder of the route in accordance with the invention is provided, is a two dimensional map. The navigation apparatus may or may not then additionally be operable to provide a three dimensional map display. In preferred embodiments the navigation apparatus may have user selectable two dimensional or three dimensional map display modes.

Preferably the navigation apparatus comprises one or more user interfaces to enable a user to interact with the apparatus.

The display of the navigation apparatus may be of any suitable type. The display displays information to the user during use of the apparatus. In embodiments the display comprises a display screen. Preferably the display screen is a touch screen. The display then provides a user interface enabling the user to interact with the apparatus.

The step of determining a route may be carried out in any suitable manner, and is preferably carried out by the navigation apparatus. The step comprises determining a route from a first location to a second location. In embodiments the first location is an origin and the second location is a destination. It will be envisaged that the route could be determined in various manners. For example, the navigation apparatus could retrieve a stored route e.g. a frequently travelled or other saved route, or could receive the route from a remote source e.g. a central server. However, preferably the step of determining the route comprises calculating the route, and preferably the navigation apparatus calculates the route and comprises means for so doing. The navigation apparatus may be arranged to calculate the route in any suitable manner. The route may be calculated automatically e.g. by the navigation apparatus and/or may take into account user specified criteria.

The representation of current position may be arranged to rotate about a given position (e.g. a fixed or current position of the representation in the visible map display area) during travel along the route as mentioned below so as to indicate a direction of travel at a given time. In embodiments of the invention, the size of the representation of the current position may remain the same throughout travel along the route.

It will be appreciated that various techniques exist for representing the movement of a current position along the displayed remainder of a determined route. Two conventional techniques are known as "north-up" view or "heading up" view. The former maintains the displayed map at a fixed rotational orientation relative to the display during travel along the route with the top of the map corresponding to a northerly direction. The representation of current position may then be rotated relative to the map during travel along the route to indicate direction of travel at any given time. The latter technique maintains the representation of current position in a fixed rotational position such as pointing upwards e.g. relative to the display, and rotates the displayed map relative to the representation to represent direction of travel during travel along the route. Rather than having the representation pointing upwards, the representation could equally be arranged to point in another direction provided that it is maintained in a fixed rotational position. The methods of the present invention are particularly, although not exclusively, applicable to arrangements in which the "north up" view is used. Of course, while it is conventional for the map to be in a "north up" orientation, other fixed rotational orientations could be used with any desired reference direction being chosen to correspond to the upward direction relative to the display. Such arrangements will therefore be referred to as arrangements in which the displayed map is maintained in a fixed rotational orientation e.g. relative to the display. Thus in embodiments of the invention the map display is controlled to maximise the amount of a remainder of the route that is represented in the visible map display area during travel along the route without rotation of the displayed map. The displayed map may be maintained at a fixed rotational orientation during the methods herein described, and the apparatus is arranged to carry out such a step.

Accordingly, in embodiments of the invention, preferably the displayed electronic map is maintained at a fixed given rotational orientation during progress along the route. The orientation may be taken to be the rotational orientation relative to the display of the navigation apparatus i.e. an axis thereof. In preferred embodiments the top of the displayed map is directed to the north. The top of the map refers to the edge of the displayed map which is located uppermost when the navigation apparatus is located in it intended use position. In these preferred embodiments in which the displayed map is not rotated, the method may comprise rotating the representation of current position about an axis of rotation of the representation to represent the direction of travel along the route. This may result in the representation appearing to follow the indicated route without needing to change the orientation of the map.

In accordance with the invention at least a part of the remainder of the determined route is displayed to the user in the visible map display area. The term "remainder of the determined route" refers to that part of the route still to be travelled to the second location. Thus the remainder of the determined route is the part of the determined route extending from the current position to the second location. The remainder of the route includes the second location (although this part may not be shown if the entire remainder of the route is not shown).

In embodiments of the invention in which the map display is controlled to maximise the amount of the remainder of the route that is represented in the visible map display area for a given map scale during travel along the route, the amount of the route here refers to the length of the route. The given map scale is a fixed map scale and may be a user specified map scale. The step of maximising may be subject to certain other constraints, such as the map orientation. In embodiments the method comprises controlling the map display to maximise the amount of the remainder of the route that is represented in the visible map display area for a given map scale and a given rotational orientation of the displayed map. In these embodiments the step of controlling the map display may comprise shifting the map in the visible map display area e.g. panning the map. This will have the effect of moving the map relative to the visible map display area to control the portion of the map that is displayed to the user. The method may comprise determining a portion of the displayed map to be displayed in the visible map display area such that the maximum possible amount of the remainder of the route is represented in the visible map display area for a given map scale. It will be appreciated that the step of selecting a map portion to be displayed will be repeated continually or intermittently as the remaining distance to the second location decreases to maintain the current location at the edge of the visible map display area. The method may comprise repeating the steps of selecting the portion of the map for one or more different remaining distances between the current location and the second location during travel along the route. This may be carried out e.g. at each map refresh or re-render point as discussed above in relation to embodiments in which a map scale is calculated.

The method may comprise selecting a first portion of the map to be displayed to maximise the amount of the remainder of the route that can be represented in the visible map display area when the current position is at a first distance along the route from the second location, and displaying the first portion of the map in the visible map display area, and repeating the steps of selecting a portion of the map to be displayed to maximise the amount of the remainder of the route that can be represented in the visible map display area and displaying the selected portion in the visible map display area when the current position is at one or more different lesser distances along the route from the second location. The method may comprise selecting a first portion of the map to be displayed to maximise the amount of the remainder of the route that can be represented in the visible map display area when the current position is at a first distance along the route from the second location, and displaying the first portion of the map in the visible map display area, and selecting a second portion of the map to be displayed to maximise the amount of the remainder of the route that can be represented in the visible map display area when the current position is at a second distance along the route from the second location, and displaying the second portion of the map in the visible map display area. These steps may be repeated continually or intermittently through travel along the route as the remainder of the route decreases. If the steps are carried out intermittently, they should be carried out sufficiently frequently such that the user will have the impression of continuous rescaling of the map i.e. smooth progress along the route. Such steps may advantageously be carried out when a map refresh or re-rendering operation is conducted.

In embodiments of the invention in which the entire remainder of the determined route is displayed to the user in the visible map display area, the method comprises the navigation apparatus controlling the map display such that a representation of the entire remainder of the determined route is provided in the visible map display area during travel along the route. It will be appreciated that a representation of current position is also provided during travel along the route. In these embodiments the representation of the entire remainder of the determined route is preferably provided throughout travel along the route. The representation of the entire remainder of the route is then always displayed in the visible map display area e.g. as remaining distance to the second location decreases. In these embodiments the representation of the remainder of the route that is displayed in the visible map display area includes a representation of the second location. This may be an end of the representation of the remainder of the route remote from the representation of current position or may comprise a specific icon.

In accordance with these embodiments, the scale of the background map is maximised while ensuring that the entire remainder of the determined route is visible. The step of scaling the displayed map may be referred to as a step of controlling a map scale. It will be appreciated that the step of maximising the map scale may be subject to other constraints, such as a fixed rotational orientation of the displayed map during travel along the route. In these embodiments the map scale may therefore be maximised for a given rotational orientation of the displayed map. In embodiments the step of maximising is carried out for a given rotational orientation of the displayed map. The scale will be increased as the remaining distance along the route to be travelled decreases, i.e. as the second location is approached. There will be some panning of the map, i.e. shifting of the map as the second location is approached.

In accordance with the embodiments of the invention in which the map scale is controlled to provide a representation of the entire determined route during travel along the route, the method may comprise the steps of calculating a map scale that is as great as possible while ensuring that a representation of the entire remainder of the determined route is or can be provided in the visible map display area, and applying the map scale to the display. For brevity the term "a map scale which is as great as possible" will be used interchangeably with the term "a maximised map scale".

The method may comprise calculating a first maximised map scale to result in a representation of the entire remainder of the determined route being provided in the visible map display area when the current position is at a first distance along the route from the second location, and applying the first maximised map scale to the display, and repeating the steps of calculating a maximised map scale to result in a representation of the entire remainder of the determined route being provided in the visible map display area and applying the maximised map scale to the display when the current position is at one or more different lesser distances along the route from the second location. The method may comprise calculating a first maximised map scale to result in a representation of the entire remainder of the determined route being provided in the visible map display area when the current position is at a first distance along the route from the second location, and applying the first maximised map scale to the display, and calculating a second maximised map scale to result in a representation of the entire remainder of the determined route being provided in the visible map display area when the current position is at a second distance along the route from the second location, wherein the second distance is less than the first distance, and applying the second maximised map scale to the display. The second or other subsequent maximised map scale will be greater than the first or previous maximised map scale. These steps may be repeated continually or intermittently through travel along the route as the remainder of the route decreases. If the steps are carried out intermittently, they should be carried out sufficiently frequently such that the user will have the impression of continuous rescaling of the map, i.e. smooth progress along the route. Such steps may advantageously be carried out when a map refresh or re-rendering operation is conducted.

The embodiments of the present invention may have the effect that the representation of the current position and the representation of the at least a part of the remainder of the route will be seen to "fill" or "just fit" into a boundary of the visible map display area in a given direction. Of course, it is meant that the representation of the current position and the representation of the at least a part of the remainder of the route together "fill" or "just fit" the boundary, not that each does this individually. In embodiments the method comprises controlling the map display such that the representation of the current position and the representation of the at least a part of the remainder of the route fill the visible map display area in a given direction during travel along the route. Thus, even as progress is made along the route the representations continue to fill the visible area in the direction. At any given time that the display is viewed, the representation of the current position and the representation of the at least a part of the remainder of the route will fill the area in the given direction. The given direction might be from top to bottom or from side to side, or along any intermediate line. The direction will be defined by a line connecting points on the representation at the different edges of the area. The term "fill" refers to the representation extending substantially from one edge of the visible map display area to another edge thereof. The other edge, may be an opposite edge. This will typically be the case for linear type routes. The representation may touch each edge.

Looked at another way, in embodiments, the representation of the current position and the representation of the at least a part of the remainder of the route just fit the boundary of the visible map display area in a given direction during travel along the route. The method may comprise controlling the map display such that the representation of the current position and the representation of the at least a part of the remainder of the route just fit the boundary of the visible map display area in a given direction during travel along the route. The direction may be a horizontal or vertical direction. The representations may just fit the boundary in only one direction or in more than one direction.

In embodiments the representation of the current position and the representation of the at least a part of the remainder of the route extend from one edge of the visible map display area to at least one other edge thereof, optionally an opposite edge thereof, during travel along the route. The representations may extend to only one other edge or to more than one other edge. In these embodiments, at least one point on the representation of the current position and the representation of the at least a part of the remainder of the route will be located at one edge and at least one point at another, preferably opposite, edge of the visible area. It will be appreciated that the points are points on the representation of current position and of the representation of the at least a part of the remainder of the route collectively, not points on an individual one of the representation of current position and the at least a part of the remainder of the route. One or both of the points may be maintained at the respective edge during the travel. The point at either edge may move along the edge or may be at a fixed position. In embodiments the point at one edge may be at or near to a representation of the current position. The point at the other edge could be located anywhere along the representation. However, typically e.g. for linear type routes, the point will be at or near to an end of the representation remote from the indication of current position. The point may be at or near to a representation of the second location. It will be appreciated that the points at the respective edges need not, however, be points toward the current position and second location respectively depending upon the shape and orientation of the route. In any of the arrangements described, the map is controlled as described during travel along the route, (i.e. during at least a continuous part thereof) and preferably throughout travel along the route i.e. not just at a given point.

In some embodiments the method comprises controlling a map scale such that the most extreme points of the representation of the current position and the representation of the at least a part of the remainder of the route in a given direction are located at edges of the visible map display area. In many embodiments one of the points will be a point of the representation of current position or in proximity thereto. The other of the points may be a point nearest to the second location. Depending upon the map scale, the point may not be close to the second location, but will be closer than the current position end of the representation. However, this will depend upon the shape of the route. For example, the route could include twists or turns, and may not be linear. The given direction may be any geographic direction. For example, in a generally north-south route, the points may be the northern most and southern most points.

It will be appreciated that in accordance with embodiments of the invention the step of controlling the map display of the navigation apparatus is carried out automatically. In embodiments this step is carried out by the navigation apparatus. In embodiments, this step is carried out under the control of a set of one or more processors of the navigation apparatus. The step is carried out without user intervention. The same applies to any other steps relating to control of the map display described herein.

The techniques of the present invention may be implemented using a suitable algorithm. Some suitable techniques may involve fitting a shape bounding points on the route representation e.g. a square or rectangle to the visible map display area and are described in more detail in the specific description below.

In embodiments in which the map display is controlled to maximise the amount of the remainder of the route that is represented in the visible map display area, the method may comprise determining a smallest rectangle or square that bounds as many points on the remainder of the route as possible and which is arranged to just fit the visible map display area. The rectangle or square will bound as much of the remainder of the route as possible. The method may then comprise centering the rectangle or square in the visible map display area and displaying the part of the map bounded by the rectangle or square in the corresponding part of the visible map display area.

In embodiments in which the map scale is controlled to provide a representation of the entire determined route during travel along the route, the method may comprise determining a smallest rectangle or square bounding all points on the remainder of the route, and determining a map scale to result in the smallest square or rectangle just fitting into the visible map display area. This may be carried out with the square or rectangle centred with respect to the visible map display area. The term "just fitting" will refer just fitting in a given direction such as in a width or length direction. The steps may be carried out at a fixed map rotational orientation. The square or rectangle may be selected to have sides extending in directions corresponding to axes defined by the visible map display area e.g. horizontal and vertical axes, and is fitted to the visible map display area with the sides aligned in the direction of the axes e.g. in horizontal and vertical directions.

It is envisaged that the navigation apparatus may be operable in modes in which respectively the map scale is or is not fixed. The method for maximising the map scale while displaying a representation of the entire remainder of the route is implemented when the apparatus is in a mode in which the map scale is not fixed. This may be referred to as an automatic zoom mode of the device. The method for maximising the amount of the remainder of the route that is represented is implemented when the apparatus is in a mode in which the map scale is fixed. This may be referred to as a manual zoom mode of the device. The modes may be user selectable modes.

It will be appreciated that in some situations multiple routes may be determined. For example, one or more alternative routes to a given second location may be provided. The routes may differ over a part or a whole of their length.

In embodiments the method may comprise controlling the map display to display a representation of as much of one or more of the routes as possible in the visible map display area (at a given map orientation and map scale). It will be appreciated that the steps of the present invention may therefore be applied to at least one determined route that is to be displayed, and any of the steps described above may be implemented in relation to the or each determined route which is to be displayed. In practice, the method may be applied to only a given one of multiple routes that are represented.

In embodiments the method may comprise scaling the displayed map to provide a representation of the entire remainder of each route in the visible map display area during travel along a route. In these embodiments the representation of each route may be fitted to the visible map display area as described with respect to a single route. This may be carried out by taking all routes into consideration when determining a maximum map scale that will allow the entire remaining portion of each route to be shown. It will be appreciated that the steps of the present invention may therefore be applied to at least one determined route that is to be displayed, and any of the steps described above may be implemented in relation to the or each determined route which is to be displayed.

In accordance with some embodiments of the invention, the map display of the navigation apparatus is controlled during travel along the route such that representation of current position is maintained at an edge of the visible map display area during travel along the route. Thus, in these embodiments, as progress is made along the route, e.g. as the displayed map and the representation of the route are updated, the representation of current position always remains at the edge of the visible map display area. The representation of current position is maintained at the edge of the visible area of the map at all times during travel along the determined route e.g. as the representation of current position becomes closer to the second location. In embodiments, the representation of current position does not move over the representation of the determined route. It will be appreciated that travel along the route may be detected by the navigation apparatus in terms of a change in current position while the apparatus is in a mode in which a determined route is displayed.

In these embodiments, the edge of the visible map display area at which the current position representation is maintained may be any region along a part of the boundary of the visible map display area. For example, the visible area may define a boundary in the form of a frame extending around the periphery of the visible map display area. The edge may then extend along one of the sides of the boundary. The edge is located at or in close proximity to the boundary. It will be appreciated that where the edge is in close proximity to the boundary, it is still within a peripheral region of the visible display area. In these embodiments the centre of the representation may be located a distance of up to 15% or up to 10% or up to 5% along a width or length of the visible display area from a closest boundary thereof along a line perpendicular to the boundary. In embodiments the visible map display area defines a central region and a peripheral region, the representation of the current position being located in the peripheral region. The representation of the current position is present only at the edge or peripheral region of the visible map display area during travel along the route. The representation is not present in and/or does not extend into a central region of the visible map display area.

In these embodiments, the representation of current position is maintained at the same edge of the visible map display area during travel along the route. The representation of current position does not move away from the edge during movement along the route. The representation of current position may be maintained at a fixed position e.g. horizontal and vertical position relative to the visible map display area during travel along the route. However, in other embodiments there may be some movement of the representation of current position along the edge e.g. due to panning of the map. Thus the representation of current position may move along an axis of the edge. In some embodiments the representation of current position remains on a given line extending along e.g. an axis of the edge during the travel along the route. For example, where the edge is bottom edge of the visible display area defining a horizontal axis, the vertical position of the representation may remain the same during the travel and there may or may not be movement along the horizontal axis.

In some embodiments the visible map display area comprises a boundary, and the edge at which the representation of current position is located at or in close proximity to the boundary. The edge extends along a part of the boundary. The visible area may define a plurality of edges extending along the boundary. The boundary may be in the form of a frame. In some embodiments the boundary is rectangular and the visible area defines four edges extending along respective sides of the boundary. It will be appreciated that the visible map display area may change during progress along a route. For example, a status bar may temporarily be located over a peripheral part of the displayed map along one edge to provide certain information e.g. relating to the presence of speed cameras. In accordance with these embodiments of the invention the representation of current position is maintained to be at the edge of that area which may be taken to be the visible map display area at any given time. Similar comments apply to maintaining other points of the representation of the remainder of the route at an edge of a visible area of the display.

In these embodiments in which the representation of current position is located at an edge of the visible map display area, it may be located at any edge of the visible map display area. In some embodiments the representation of current position is maintained at a bottom edge of the visible map display area. The most appropriate edge at which to maintain the representation and optionally the position along the edge, may be selected depending upon a general direction of the determined route.

It will be appreciated, however, that it is only optional that the representation of current position is maintained at an edge of a visible map display area during travel along the route. Depending upon a shape of the route and other factors, this may not be appropriate.

In any embodiment of the method, the method may comprise providing a representation only of the current position and the at least a part of the remainder of the route to the second location in the visible map display area and not of any portion of the route that has already been travelled. Thus the representation of current position may be located at an origin of a portion of the at least a part of the remainder of the determined route represented on the displayed map. The method may comprise representing only that portion of the determined route which portion is located between the representation of current position and the second location. Rather than illustrating progress by displaying a representation of current position which moves over the route to be travelled, the displayed map may be moved e.g. panned relative to the representation of the current position.

The methods of the present invention in any of its aspects or embodiments may further comprise the step of providing navigation instructions to guide a user along the determined route. Thus the invention may comprise navigating along the determined route.

The methods of the present invention in accordance with any of its aspects or embodiments may further comprise the step of providing navigation instructions to guide a user along the determined route. Thus the invention may comprise navigating along the determined route.

References to "travel along the route" herein refer to any time during which travel occurs with the aim of moving from the first location to the second location taking into account of or, preferably, following the determined route. It will be appreciated that actual travel may not exactly follow the determined route at all times. For example, there may be periods of deliberate or unintentional deviation from the determined route.

References to movement "up", "down" or "sideways" and references to "vertical" and "horizontal" refer to directions determined when the navigation apparatus is its normal use orientation. Such directions may be determined by reference to a fixed reference such as the edges of the display e.g. screen.

The term "panning" herein takes on its usual meaning, and refers to shifting or translation of the displayed map up, down or sideways or along another line.

References to actions being carried out during travel along the route may, if not already stated, refer to actions being carried out for at least a continuous part of, or optionally the entirety of travel along the route from the first location to the second location unless the context demands otherwise.

The principles of the present invention are applicable to any form of navigation apparatus. In accordance with any of the aspects or embodiments of the invention the apparatus may comprise a display for displaying a digital map to a user and a processor configured to access digital map data and cause a digital map to be displayed to a user via the display. The apparatus may further comprise a user interface operable by a user to enable the user to interact with the apparatus.

One particular area of utility is in relation to portable navigation devices (PND). In embodiments, therefore, the navigation apparatus is an apparatus of a portable navigation device (PND). In accordance with a further aspect, the navigation apparatus referred to in the aspects and embodiments of the invention above is a portable navigation device (PND).

The invention is also applicable to navigation apparatus which is provided as part of an integrated navigation system. For example the apparatus may form part of an in-vehicle integrated navigation system.

Regardless of its implementation, as discussed above a navigation apparatus used in accordance with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the navigation apparatus may be implemented by means of an application of a processing device which does not form part of a specific navigation device. For example the invention may be implemented using a suitable computer system arranged to execute navigation software. The system may be a mobile or portable computer system e.g. a mobile telephone or laptop, or may be a desktop system.

The present invention extends to a computer program product comprising computer readable instructions executable to perform a method according to any of the aspects or embodiments of the invention, or to cause a navigation apparatus to perform such methods.

It will be appreciated that any of the further aspects of the invention may include any or all of the features of the invention described in relation to any other aspects and embodiments of the invention to the extent they are not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Various embodiments of the present invention will now be described with reference to the accompanying drawings, in which.

DETAILED DESCRIPTION OF THE DRAWINGS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

Figure 1:
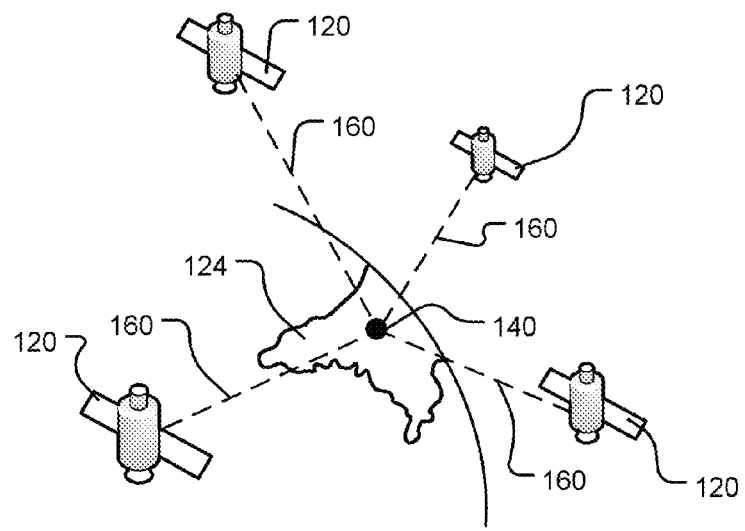
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
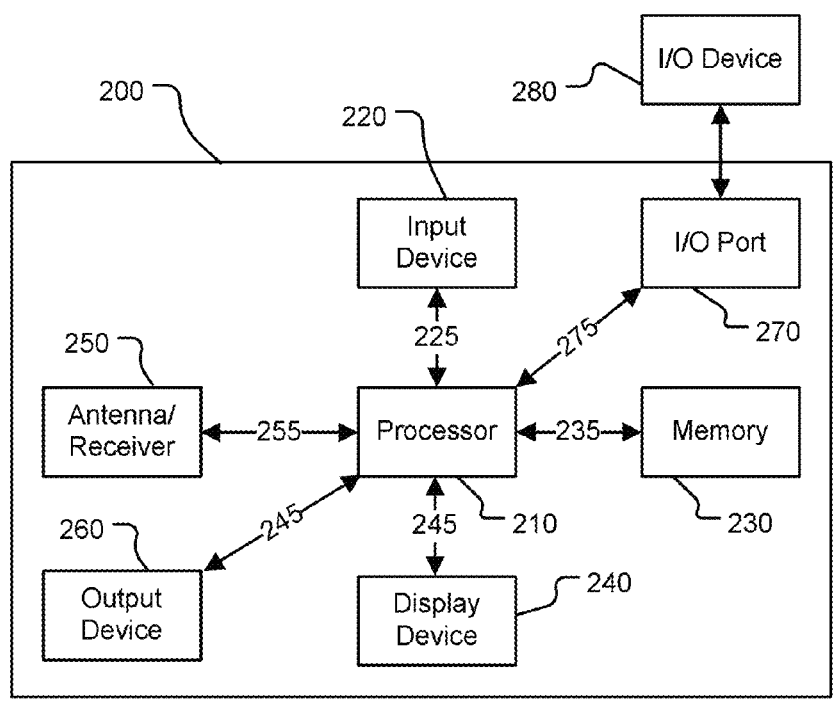
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
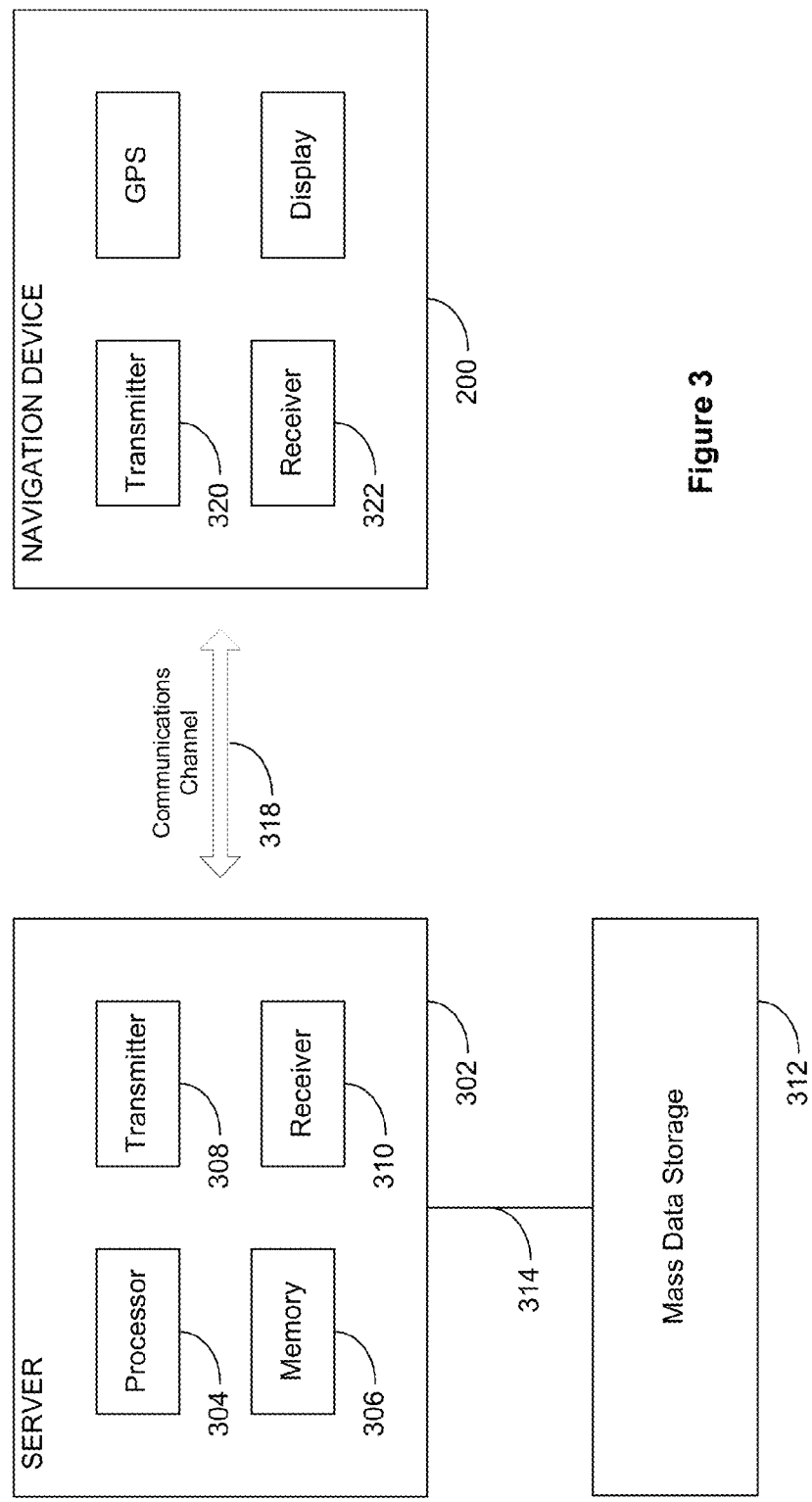
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
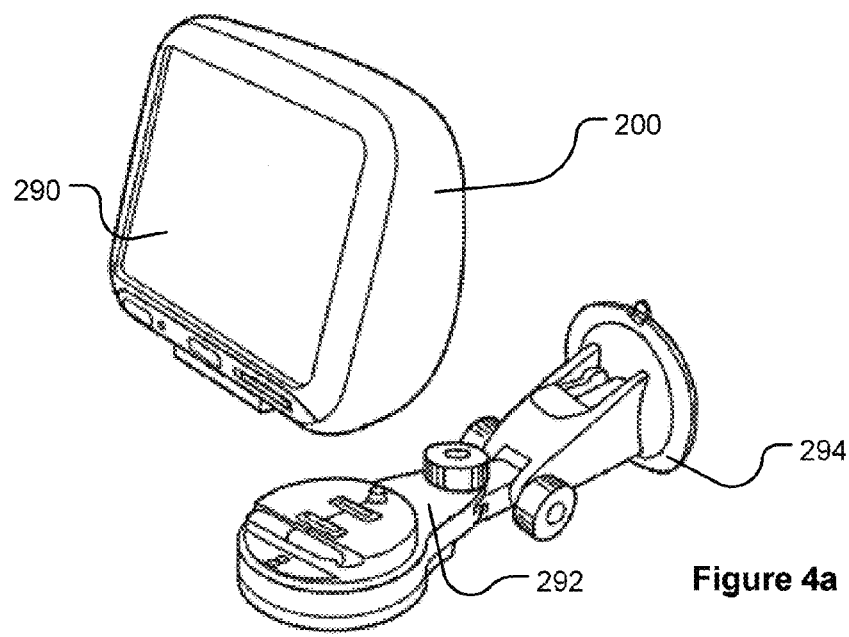
FIGS. 4A and 4B are illustrative perspective views of a navigation device.
Figure 4B:
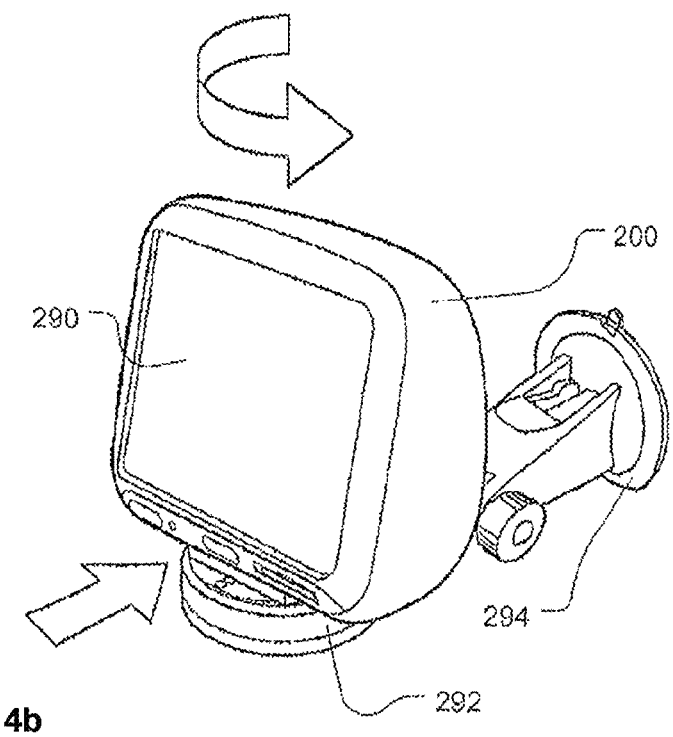

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

The methods of the present invention provide improved techniques for displaying a route to a user of a navigation apparatus. Some embodiments of methods in accordance with the invention will be described by reference to FIGS. 5 and 6; these embodiments of the invention are ones in which the scale of the displayed map is not fixed. Some embodiments of methods in accordance with the invention will be described by reference to FIGS. 7, 8 and 9; these embodiments of the invention are ones in which the scale of the displayed map is fixed.

Figure 5:
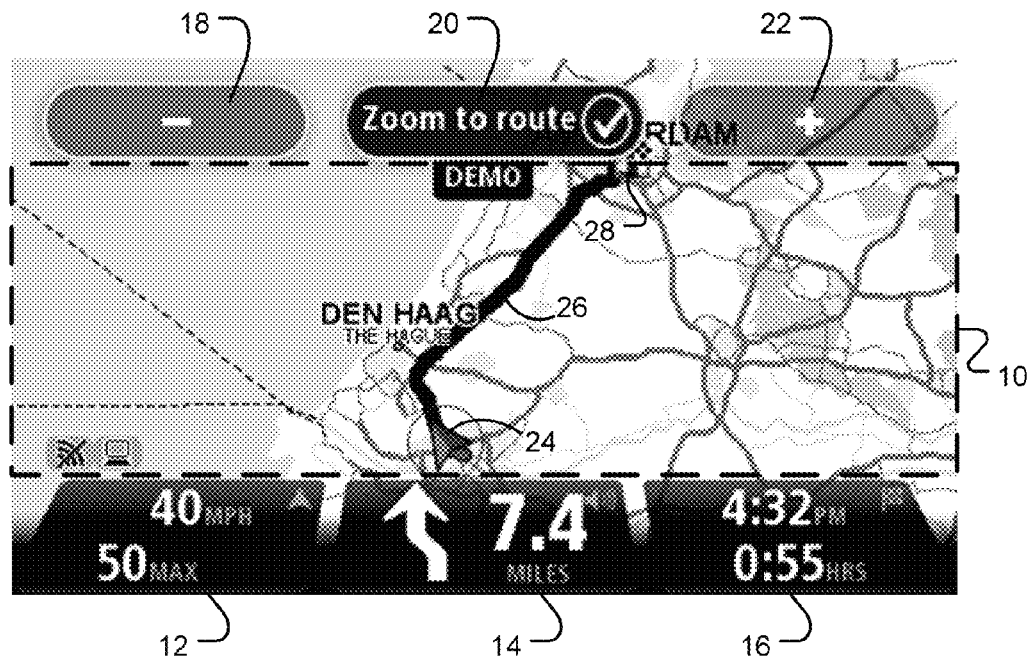
FIG. 5 is a view of a display of a PND operating in accordance with an embodiment of the invention in which the map scale is maximised while ensuring that the entire remainder of the route is displayed during progress along a route.

FIG. 5 shows a display of a PND in this mode of operation at one point during navigation along a calculated route. The display is provided on a touch screen of the PND. The PND has previously calculated a route between a first location e.g. origin and a second location e.g. destination. In this case the destination corresponds to the home of the user. It will be seen that the display includes a visible map display area 10 in which the features of the displayed map are visible to a user. This area defines a boundary indicated by dotted lines. The visible map display area is inboard of this boundary. The area is rectangular in shape, having top and bottom edges and opposed side edges extending along the boundary.

Below a bottom edge of this visible map display area 10 various information panels are provided. These information panels include a panel giving information regarding a current speed 12, a panel 14 providing an indication of the next manoeuvre and the distance to the next manoeuvre and a panel 16 providing indication of the current time and the remaining time to the destination. Above the upper edge of the visible display area 10 various zoom option buttons are provided. These include a zoom out button 18, and a zoom in button 22. In this embodiment, a zoom level i.e. map scale has not been preset, and an automatic zooming option is enabled. This is indicated by the further button 20 labelled "zoom to route" which displays a tick symbol, showing that this function has been selected.

It will be seen that within the visible map display area 10 a background map is displayed, with a representation of a current location in the form of the arrow 24 superposed thereon. A representation of the remainder of the route from the current location 24 to the destination 28 is provided in the form of a highlighted line 26 on the background map. An icon representing home is located at the destination 28. It will be seen that the arrow 24 indicating current position is located at the bottom edge of the visible map display area 10.

As shown in FIG. 5, a representation of the entire remainder of the route from the current position to the destination is provided in the visible map display area. In this arrangement, as the current location approaches the destination during travel along the route, the entire remainder of the route to the destination continues to be represented on the map displayed in the visible area 10, and this continues throughout travel along the route. This is achieved by controlling the map scale of the displayed map such that it is maximised while still permitting the entire remainder of the route to be shown. This is done subject to the constraint that the map rotational orientation is fixed, in this case in the north up type orientation. At the same time, the current position arrow 24 remains at the bottom edge of the area, although it will be appreciated that this will not always be the case depending upon the configuration of the route. The current position arrow may not always be at an edge of the area. It will be understood that there will be some panning over the displayed map area during travel along the route. In this embodiment the map is in a two-dimensional view, and indicates progress along the calculated route in a "north up" view. Thus the indicator of the current position rotates about a given position to indicate direction of travel along the route.

In this way, throughout travel along the route, the representation of the remainder of the route continues to extend substantially over the entire distance from the edge of the visible map display area where the current position indicator 24 is located to another edge, in this case the opposite edge, where the destination 28 is located. Thus the representation fills or just fits into the available visible map display area during travel along the route, in this case in the direction of the route which is generally south-north.

It will be appreciated that depending upon the direction and shape of the route, the point on the route at the other edge of the visible display area to the edge at which the current position representation is located will usually, but not necessarily, be a point at or near the destination or second location. The other edge will often, although not necessarily, be an opposite edge to the edge where the current position representation is found. In other arrangements, it will be appreciated that the representation of current position may not be located at an edge, and a different part of the representation of the remainder of the route may instead be located at an edge of the visible display area.

Figure 6:
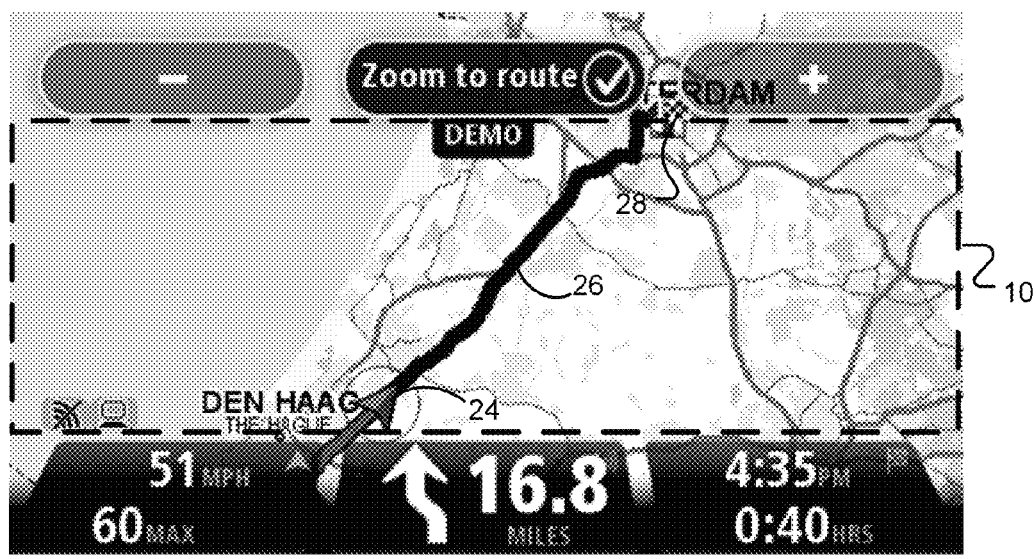
FIG. 6 is another view of the display of the PND when the current position is closer to the destination than in FIG. 5.

FIG. 6 is a corresponding view of the display during navigation along the route somewhat further along the route. In this case the current position is 40 minutes rather than 55 minutes from the destination. It may be seen that the destination 28 and the current position indicator 24 remain at opposite edges of the visible display area of the map 10. The entirety of the remainder of the route still is displayed, and just fits into the visible map display area. The map scale has been increased as far as possible while ensuring that the entirety of the remainder of the route is shown in the visible map display area.

As progress continues along the route, the apparatus repeatedly recalculates a map scale of the displayed map to ensure that the entire remainder of the route always just fits into the visible area of the displayed map, while maintaining the current position indicator at the bottom edge thereof. This may be achieved by carrying out a scale calculation whenever a rendering call is made or the screen is refreshed. As mentioned above, it will not always be the case that the representation of current position is located at an edge of the display, depending e.g. upon the shape of a route, although this will often be the case. It is preferred that some point on the representation of the current position or the remainder of the route is located at the edge of the visible area, and that another point is located at another edge thereof.

One way in which the map scale can be maximised to result in the representation of the entire remainder of the route just fitting into the screen throughout travel along the route will now be described.

A set of one or more processors of the PND is arranged to implement an algorithm which performs the following steps. A smallest rectangle bounding all of the points of the remainder of the route is calculated. Initially a rectangle is provided that has all four vertices equal to the current location. The bounding rectangle is then determined by running through a remainder of the route and expanding the initial rectangle to encompass each point of the route. For greater efficiency, the algorithm is desirably optimized not to scan every point on the route, but instead to use stored sub rectangles. The bounding rectangle is defined in geographical coordinates. A map scale is then determined to ensure that this bounding rectangle just fits into the visible map display area 10 when oriented with its centre at the centre of the visible map display area 10. This will result in the indication of current position being as close to the edge of the screen as possible when the scale is applied. The display area is defined in screen coordinates. The map scale is then used to set the map scale for the relevant part of the map that is then displayed on the screen. This process is continuously repeated as the e.g. vehicle moves along the route, with new bounding rectangles being calculated each time a rendering call is made or the screen refreshed.

Another arrangement will now be described by reference to FIGS. 7 and 8. In contrast to the arrangement of FIGS. 5 and 6, in this arrangement the map scale may not be changed by the PND. The map scale has been fixed by the user specifying a given zoom level for the map view.

Figure 7:
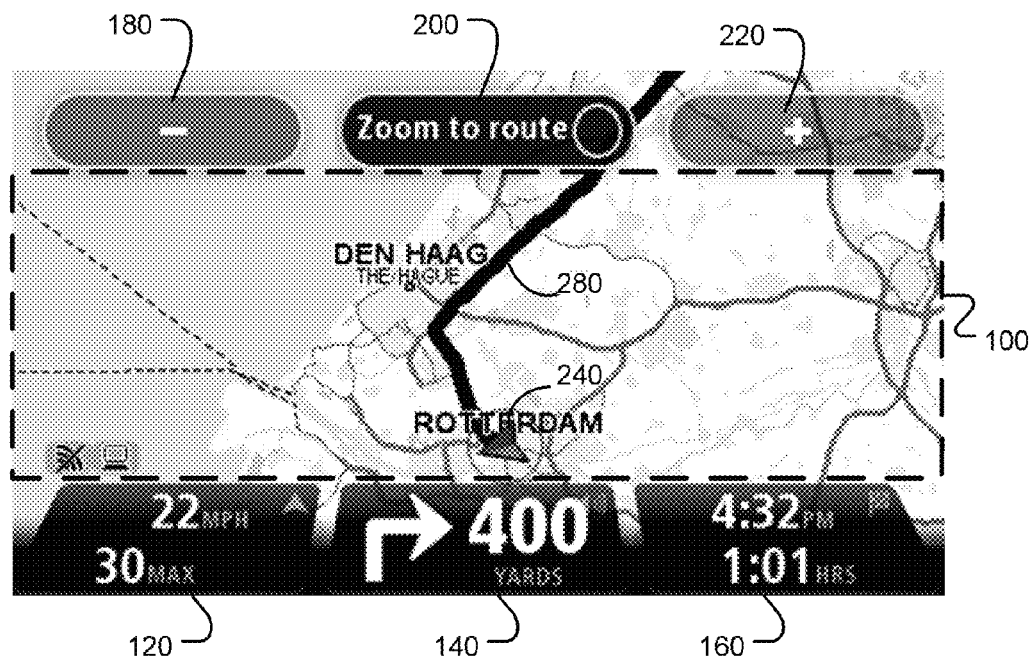
FIG. 7 is a view of a display of a PND operating in accordance with an embodiment of the invention in which the map scale is fixed and the display controlled to show as much of the remainder of the route as possible during travel along the route.

FIG. 7 illustrates a display of a PND similar to that of FIG. 5 or 6 other than that the zoom to route option is not selected. The display provides a display of an electronic map of a region with a representation of a determined route 280 superimposed thereon. An indication of current position in the form of an arrow 240 is also provided.

As in the earlier arrangement, the display defines a visible map display area 100 lying within the dotted lines as shown. Outside this area are provided the information bars 120, 140, 160 corresponding to the bars 12, 14 and 16 in FIG. 5. At the top of the display above the upper edge of the visible area of the displayed map are the zoom control buttons 180, 200, 220 corresponding to buttons 18, 20 and 22 in FIG. 5. In this embodiment, it will be noted that button 200 indicates that the zoom to route option is not selected. Thus in this mode of operation the user will have specified a desired level of zoom using the zoom control buttons 180, 220.

As in the FIGS. 5 and 6 arrangement, the map is displayed in a 2-D form, and the displayed map is provided in a fixed "north up" rotational orientation format. It will be seen that in contrast to the arrangement of FIGS. 5 and 6, the destination is not included in the visible map display area, and lies somewhere off the top of the display. Only a part of the remainder of the route to be travelled is displayed in the visible area.

As in the arrangement of FIGS. 5 and 6, in this embodiment of the invention, throughout travel along the route, the map display is controlled such that the indication of current position 240 remains at the bottom edge of visible map display area 100. As the zoom setting has been set by a user, it is not possible to change the map scale during progress along the route to show the entire remainder of the route at all times. However by locating the current position indicator at the bottom of the visible map display area, the amount of the route which may be shown for a given map scale i.e. set by the zoom level may be maximised. The PND shows as much of the remaining route as possible for the given fixed map scale. The PND pans the displayed map view to maintain the current position at the bottom edge of the display area and to maximise the amount of the remainder of the route which may be seen while keeping the map scale constant and also with a fixed rotational orientation for the displayed map. The representation of the determined route 280 extends from the edge of the visible display area 100 at which the current position indicator 240 is located to an opposite edge. The representation of the route just fits or fills that visible map display area in a given direction. As mentioned above in relation to the FIGS. 5 and 6 arrangement, in other situations, the edge to which the indicated route extends may not always be an opposite edge, and the current position indicator may not always be shown at the bottom edge.

Figure 8:
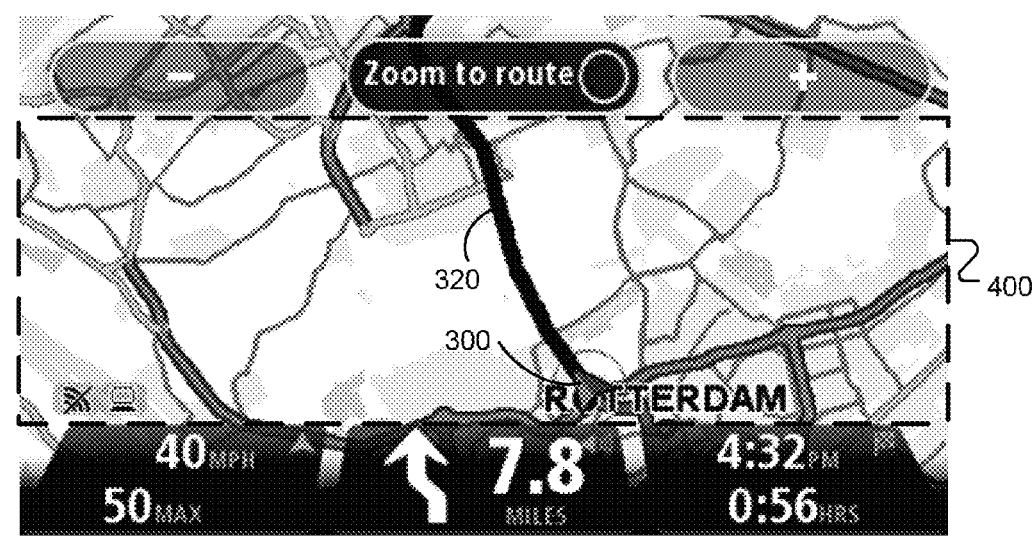
FIGS. 8 and 9 are views of a display of a PND operating in the same mode as illustrated in FIG. 7 but where the map scale has been set to larger levels.

FIG. 8 shows another example of a PND operating in accordance with a manual zooming arrangement in accordance with the invention of the type described by reference to FIG. 7. In this case the user has manually set the zoom level to a different higher level such that the map scale is larger than in the FIG. 7 example. It will be seen that similar to the FIG. 7 embodiment the remaining part of the route 320 from a current position indicator 300 is shown in a manner such that it extends from one side of the visible display area to the other. The amount of the route shown is maximised for the fixed map scale, and the display is controlled such that this continues to be the case throughout travel along the route without changing the map scale. It is not possible to show the entire remainder of the route at least until closer to the destination than shown in FIG. 8. The current position indicator 300 is at the bottom edge of the visible display area and is maintained there throughout travel along the route.

Figure 9:
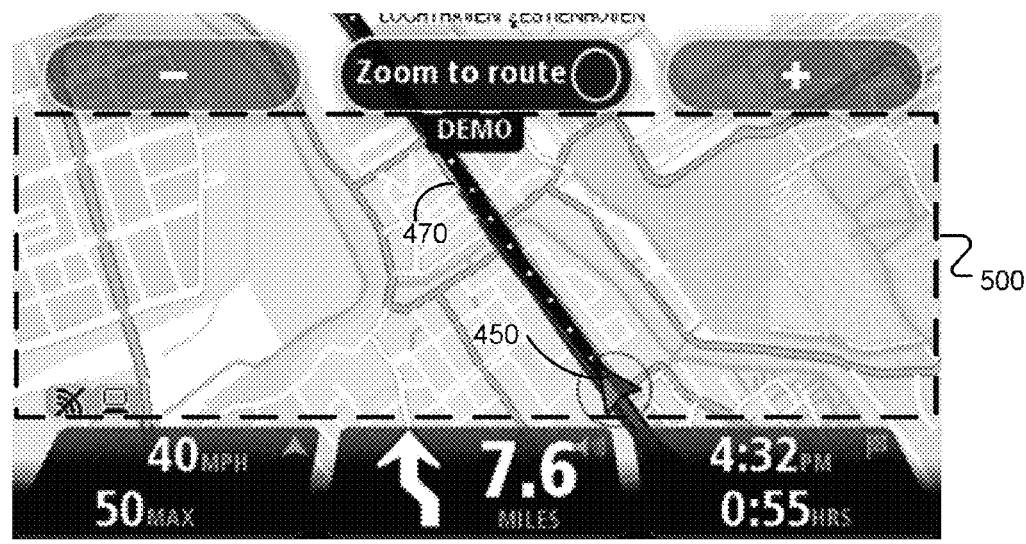

FIG. 9 shows yet another example of a PND operating in accordance with a manual zoom arrangement of the type also used in the FIG. 7 or 8 arrangements. Here the user has set the zoom level to another still higher but fixed level. Thus the map scale is set at a larger value. Once again the indicator of the current position 450 lies at the bottom edge of the visible display area 500 such that the indication of the remaining route 470 extends to an opposite edge of the visible display area with as much of the route being shown as possible for the fixed map scale. The display continues to be controlled in this way during travel along the route.

One way in which the map display may be controlled to maximise the amount of the remainder of the route which may be shown in the visible display area for a given map scale as in the FIGS. 7 to 9 embodiments will now be described.

The PND repositions the map in the visible display area during travel along the route i.e. pans the map so that the current location and as much as possible of the remainder of the route are within the visible map display area at the current fixed zoom level. An algorithm running on a set of one or more processors of the PND again searches for a rectangle, this time bounding some points on the route and at the predefined fixed zoom level i.e. map scale. Thus, again the route is considered in "screen space". In this case it is not known how much of the route, i.e. how many points thereof, can fit into the visible map display area. In this case, the rectangle is selected such that it bounds as much of the route ahead as possible constrained by the requirement that the rectangle must fit into the visible map display area with its centre at the centre of the visible map display area. The corresponding portion of the remainder of the route is then shown superimposed on the relevant part of the background map. As the rectangle is centred with respect to the display area, the indication of current position will be as close to an edge of the area as possible. The calculation can be made more efficient or optimized by using stored sub rectangles during these steps rather than scanning each point of the route as described in relation to the FIGS. 5 and 6 arrangement.

As in the earlier arrangement of FIGS. 5 and 6, as progress is made along a route, the remainder of the route to be indicated changes. Thus the process of finding a suitable bounding rectangle is repeatedly carried out during travel along the route, and the map display controlled accordingly.

It will be seen that whether the automatic zooming mode of FIGS. 5 and 6, or the manual zooming mode of FIGS. 7 to 9 is used, the user will be able to see an overview of the route or part thereof filling the entire screen without needing to intervene to adjust settings. The user does not need to pan and zoom themselves to show the route on screen most efficiently.

A way in which the method of the present invention may be implemented in a PND may be illustrated by reference to FIGS. 5-9. In the zoom controls there is an additional button, the "zoom to route" button. This is button 20 in the FIG. 5 view, and button 200 in FIG. 7. This button may be tapped to select or deselect the zoom to route function.

When zoom to route is not selected, the display of the remainder of the route will be provided in the way described with reference to FIGS. 7 to 9. Thus as much of the remainder of the route as possible will be shown for the current zoom level. The user may then operate the zoom to route button e.g. 200. In this case the PND will zoom out to show the entire route, and an automatic zoom type operation not in accordance with the invention of the type described by reference to FIGS. 5 and 6 enabled for further travel. It will be appreciated that in the manual zoom mode as illustrated by reference to FIGS. 7 to 9, if the entire route is visible in the display when calculated in accordance with the methods described, the user may be able to zoom to a higher map scale further using the zoom control buttons.

When automatic zooming is selected as in the FIG. 5 arrangement, tapping the zoom route button once more will restore a previously manually selected zoom level and disable automatic zooming on the route. Thus route display will proceed in accordance with the invention in the manner described by reference to FIGS. 7 to 9 embodiments at a previously selected zoom level for the next part of the travel.

When the apparatus is in an automatic zooming mode as shown in FIG. 5, i.e. the zoom to route button has been pressed, tapping the minus zoom button 180 as shown in FIG. 7 may be arranged to result in zooming out from the current automatic zoom level and to disable further automatic zooming of the route. Tapping the plus button 220 will be arranged to zoom in starting at the current automatic zoom level and disable automatic zooming of a route.

When no route is planned and the automatic zooming is on in a two-dimensional map view, the map display may be arranged to zoom in on the current GPS position which will be centred on the screen. When automatic zooming is off, the map will be maintained at a fixed zoom level until the user intervenes to change the zoom level. The map display method described by reference to FIGS. 7 to 9 will then be implemented.

Figure 10:
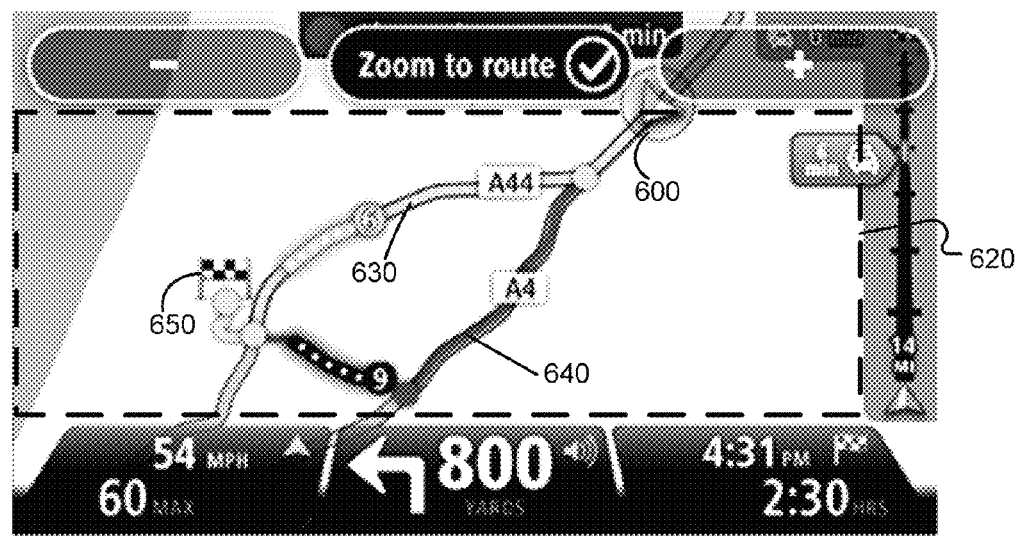
FIG. 10 illustrates a display of PND operating in accordance with an arrangement not in accordance with the invention as described by reference to FIGS. 5 and 6 but with two routes being shown.

FIG. 10 shows a further embodiment in which there are multiple routes shown. For example one of the routes may be an alternative route. FIG. 10 illustrates an arrangement having multiple routes in which the automatic zooming or zoom to route functionality is enabled as described by reference to FIGS. 5 and 6. Here it will be seen that the current position indicator 600 is located at an edge of the visible display area 620, although this may not always be the case. Indications of two determined routes 630, 640 are provided to a destination 650. It will be seen that a zoom level has been automatically selected which results in the entirety of both routes to the destination 650 being visible from the visible map display area and with the scale being as large as possible. A part of one of the routes is located to be at the opposite edge of the display area. In this way the routes fill the display area. A zoom level to show two routes may be calculated in a similar manner to that described by reference to FIGS. 5 and 6, by determining the maximum and minimum X and Y positions associated with any one of the routes to be displayed. A bounding rectangle is then found which encompasses the entirety of all of the routes, and used to obtain a scale for displaying the routes in the visible map display area.

In a non-automatic zoom mode in accordance with the invention as described by reference to FIGS. 7 to 9, two routes can be shown in a similar manner to the way in which a single route is shown in the FIGS. 7 to 9 embodiments by maximising the amount of one or more of the routes which may be shown for a given scale.

While in the methods described above the current position indicator is maintained at an edge of the visible display area, it will be appreciated that this is not always the case, depending upon the shape of the route and other factors.

The invention claimed is:

1. A method for displaying route information using a navigation apparatus, comprising:
   determining a route from a first location to a second location; and
   providing, on an electronic map displayed by the navigation apparatus, a representation of a current position and a representation of a remainder of the determined route during travel along the determined route,
   wherein the method comprises scaling the displayed map so as to maximize a map scale while providing a representation of the entire remainder of the determined route in a visible map display area during travel along the route, wherein the scaling of the displayed map comprises determining a smallest rectangle or square bounding all points on the remainder of the route and determining a map scale to result in the smallest square or rectangle just fitting into the visible map display area.

2. The method of claim 1, comprising calculating a first maximized map scale to result in a representation of the entire remainder of the determined route being provided in the visible map display area when the current position is at a first distance along the route from the second location, and applying the first maximized map scale to the display, and repeating the steps of calculating a maximized map scale to result in a representation of the entire remainder of the determined route being provided in the visible map display area and applying the maximized map scale to the display when the current position is at one or more different lesser distances along the route from the second location.

3. The method of claim 1, comprising controlling the map display such that the representation of current position and the representation of the remainder of the determined route fill the visible map display area in a given direction during travel along the route.

4. The method of claim 1, comprising controlling the map display such that the representation of the current position and the representation of the remainder of the route extend from one edge of the visible map display area to another edge thereof during travel along the route.

5. The method of claim 1, wherein said map is a two dimensional map.

6. The method of claim 1, wherein the displayed map is maintained at a fixed rotational orientation during travel along the route.

7. The method of claim 1, wherein the remainder of the route that is represented in the visible map display area is not linear.

8. A navigation apparatus, comprising:
   a display for displaying an electronic map to a user; and
   one or more processors arranged to:
   determine a route from a first location to a second location;
   provide, on the electronic map displayed on the display, a representation of a current position and a representation of a remainder of the route determined from the first location to the second location, and
   scale the displayed map so as to maximize the map scale while providing a representation of the entire remainder of the determined route in a visible map display area during travel along the route, wherein the scaling of the displayed map comprises determining a smallest rectangle or square bounding all points on the remainder of the route, and determining a map scale to result in the smallest square or rectangle just fitting into the visible map display area.

9. The navigation apparatus of claim 8, wherein the remainder of the route that is represented in the visible map display area is not linear.

10. A non-transitory computer program product comprising computer readable instructions which, when executed by one or more processors, cause the one or more processors to perform a method for displaying route information using a navigation apparatus, comprising:
    determining a route from a first location to a second location; and
    providing, on an electronic map displayed by the navigation apparatus, a representation of a current position and a representation of a remainder of the determined route during travel along the determined route,
    wherein the method comprises scaling the displayed electronic map so as to maximize a map scale while providing a representation of the entire remainder of the determined route in a visible map display area during travel along the route, wherein the scaling of the displayed electronic map comprises determining a smallest rectangle or square bounding all points on the remainder of the route, and determining a map scale to result in the smallest square or rectangle just fitting into the visible map display area.

11. The non-transitory computer program product of claim 10, wherein the remainder of the route that is represented in the visible map display area is not linear.

* * * * *